Patented Nov. 14, 1950

2,529,835

UNITED STATES PATENT OFFICE 2,529,835

METAL-CASTING MOLDS AND PROCESSES AND MATERIALS FOR PRODUCING THE SAME

Manvel C. Dailey, Elmhurst, and Joseph R. Parsons, Chicago, Ill., assignors to United States Gypsum Company, Chicago, Ill., a corporation of Illinois No Drawing. Application January 18, 1947, Serial No. 722,954

13 Claims. (Cl. 22—188)

The present invention relates to improvements in molds for the shaping of molten metal, and to materials for producing them, and is particularly directed to special types of calcium sulfate plasters which, when properly manipulated, can be caused to produce smooth surfaced molds possessing a high degree of body permeability.

While so-called plaster molds have been used for casting metals, these have almost always consisted of the anhydrous form of gypsum. While the molds were cast from calcium sulfate hemihydrate slurries, and poured over the pattern and allowed to set in contact therewith, they were then not only dried, but heated sufficiently to drive out the water of crystallization. This required considerable heat and a long time.

Some attempts were also made to increase the permeability of plaster molds, as by re-crystallizing the acicular calcium sulphate dihydrate crystals in the body of the mold by a long, complex and expensive steam treatment in an autoclave, followed by slow cooling in the presence of excess water to form rounded grains or granules within the body of the mold, interspersed with sufficient interstices to provide a modicum of permeability. As an example of this type of mold, mention might be made of the patent to Bean, No. 2,220,703.

In accordance with the present invention, however, long and expensive drying of the molds is avoided; in fact, they can, under circumstances detailed hereinbelow, be used while still containing even interstitial water, i. e. when actually wet.

This is a totally new procedure, and one which no one familiar with this art would have believed possible. When one considers that molten metal will thus be brought into direct contact with water, or at least a compound readily decomposed by moderate heat to release free water, the proposal is not only astounding but paradoxical. The permeability attainable by the process of the present invention is, however, so great that the mold body is sufficiently open to provide for the ready escape of all the formed steam from the mold without impairment of the surface characteristics of the metal casting. The cooling effect occasioned by the vaporization of this water is also availed of, and this feature is an important consideration in this art.

The present invention provides important improvements in this general art in that it provides several novel features; namely, ability to produce a calcium sulfate mold which, if desired, may be used in the form of the dihydrate, but the permeability or porosity of which can be simply and accurately controlled within extremely wide limits. By use of this invention the time-consuming and complicated method of converting the interior of the mold to a permeable mass is completely avoided. The amount of heat needed for processing of molds after forming and during conditioning for casting is very greatly reduced, permitting the use of much smaller and lower temperature mold-drying ovens and speeding up the mold drying time by several hundred percent. The process is adapted for use by any foundry, requiring small investment expense for installation of equipment for processing and production. Control procedures are simple and capable of easy mastery by average foundry personnel. Molds of a high degree of dimensional stability and accuracy may be produced. Due to the fact that molten metal may be cast directly into uncalcined molds with the production of smooth surfaced, excellently detailed castings, it is possible, by following the teaching of the present invention, to produce much larger and more complicated castings in plaster than has hitherto been possible. Such castings possess all the advantages of small castings as made in plaster, and greatly increase the practical scope of use of plaster in this art. Furthermore, the teachings of this invention are not confined to plaster alone, but may be employed as well to molds produced by use of other types of cementitious materials, such, for example, as high alumina cement or Portland cement, or to precision type molds such as are made from use of mixtures of silica and ethyl silicate, or to molds made from mixtures of clay and refractory aggregates or other types of bonding agents, such as water-soluble thermosetting resins combined with proper aggregates or fillers.

One of the main objects of the present invention is to provide highly permeable molds suitable for the precision casting of metals, the molds possessing thin, fine-grained, smooth surfaces for accurate surface reproduction, while the body of the mold comprises a cellular mass of bonded material, the individual cell walls of the mass being perforated or broken to provide intercommunicating channels throughout the body structure of the mold.

A further object of the invention is to provide a mold such as described above in which the bonded mold body consists essentially of calcium sulfate dihydrate, or the dehydration products thereof.

It is a further object of this invention to provide a process of producing plaster molds suitable for receiving molten metal, the permeability of these molds being controllable throughout a wide range by the proper control of the plaster composition and methods involved in the preparation of the slurries from which the molds are cast.

It is the further object of the present invention to provide metal casting plasters suitable for the production of molds into which metal may be cast without the need for dehydration or calcining of the gypsum molds prior to casting the metal thereinto. Other objects of the invention will become apparent from the further description herein below, and are designed to provide improvements in metal-casting plasters and techniques of use, all as further described and claimed herein.

In addition to the use as plaster metal-casting molds, the compositions as disclosed herein will be found useful in other types of applications.

Metal-casting molds of the type described may be produced by incorporating in a slurry of plaster and water a small amount of a suitable foaming agent and subjecting the mixture to violent agitation in the presence of air. The foaming agent is so selected as to produce a foam or multiplicity of fine air bubbles throughout the mass of the slurry. With proper control of type and amount of plaster, type and amount of mixing water, and type and degree of mixing, all of which variables will be discussed in further detail, it is possible by this means to produce a foamed slurry which will retain its foam structure until the plaster has set. During the setting or hydration of the hemihydrate, the individual foam cells are perforated or partially ruptured, resulting in the production of a mass of interconnecting cellular voids throughout the structure. At the time of perforation of the cell walls the mass has developed sufficient rigidity for the individual cells essentially to retain their original substantially spherical shape.

By proper control of the variables involved, it has been found possible to produce plaster molds by this process over an enormous range of permeability. For example, molds may be produced possessing permeabilities lying anywhere as desired within the range of 0.6-200, or more, A. F. A. permeability units. The permeability values listed herein are expressed as Standard Permeability Units, as shown in the American Foundry Association Standards Handbook on Sands, 5th edition, 1944. The values were determined with 2" x 2" cylindrical test specimens, tested with a Dietert Permeability Meter. For the sake of comparison, practical foundry sand molds can be varied in permeability between a range of approximately 4 to 40 permeability units. Plaster molds heretofore usable in this art possess maximum permeabilities of well below 40, and without the use of elaborate processing techniques, the permeability of calcined metal-casting plaster molds will not exceed 0.6-0.8 units. Molds as described herein may be formed in the usual manner by pouring of the mixed slurry over any normal type of pattern. The foamed structure of that part of the slurry coming into intimate contact with pattern surfaces is broken on contact, producing a smooth, finely detailed, thin surface layer next to the pattern face, backed up by the perforated cellular mold body structure.

Permeability in the mold is made possible by the use of any of a large number of surface active agents which are capable of generating a copious foam in the presence of gypsum and mixtures of gypsum with organic or inorganic additives. The most suitable of the surface active agents which have been found adapted for use in the practice of the present invention are organic compounds having hydrophilic and hydrophobic groups present in the same molecule. The hydrophobic groups consist of hydrocarbon chains, alkyl aromatic groupings or combinations of hydro-aromatic and aliphatic rings. The hydrophilic groups can be classified as:

(1) Groups containing oxygen or sulphur with or without hydrogen;
(2) Groups containing nitrogen;
(3) Groups containing sulphur and oxygen or phosphorus and oxygen;
(4) Groups containing halogens.

To these may be added unsaturated bonds such as —HC= and —C=C—, which, when present in organic chains, promote solubility in water. Thus is may be seen that there exists an enormous number of chemical compounds which may fulfill the present requirements. By varying the degree of balance between the hydrophobic and hydrophilic groups, any one of the surface active properties of these agents, such as foaming, wetting, detergency, or emulsification may be emphasized at will. Surface active agents may be divided into four classifications:

(1) Anionic;
(2) Cationic;
(3) Non-ionic;
(4) Mixed anionic-cationic;

depending on their ionization behavior in solution. A wide variety of chemical compounds comprise each of the four groups as listed above. For use in the process of the present invention it has been found that surface active agents in each of these classifications perform satisfactorily. However, there exists a wide difference in the effectiveness of various types of surface active or foaming agents. It is preferable to employ agents which are very efficient in producing fine celled foams in the presence of gypsum; the foamed cell structure of which is preferably uniform and small celled in size, and which preferably do not markedly accelerate or retard setting time of calcium sulfate hemihydrate in the proportion employed. The foam produced should be fluid and not stiff in nature, and the surface tension of foams produced should be such that individual cell walls become perforated readily during setting or hydration of the calcium sulfate hemihydrate. Some surface active agents, such, for example, as soap bark or the more concentrated active ingredient thereof, saponin, rosin soap, licorice bark and the like, produce very efficient foams in the presence of gypsum, but their foams tend to be somewhat too stiff and strong so that the cellular structure thereof might not be adequately broken during hydration of the gypsum so as to develop the desired degree of permeability. Specific chemical types of foaming agents which we have found highly effective in our compositions include alkyl aryl sodium sulfonates, trimethyl ammonium halides of higher alcohols, such as lauryl alcohol, complex amines, such as betaine, oleylmethyl tauride, alkali salts of sulfonated higher alcohols, etc. In the latter classification we have found that the most effective foaming agents for our purpose contain from 12 to 16 carbon atoms in the alkyl radical in the hydrophobic end of the molecule, although we do not wish to be limited to use of wetting agents within this rather narrow classsification.

If a foaming agent is used that forms a foam which is too resistant to breaking during the setting of the $CaSO_4 \cdot \frac{1}{2}H_2O$, the permeability will be too low unless large amounts of foaming agent are employed with production of very light weight molds possessing low strength. Thus if the structure is cellular, rather than porous, i. e. more like a honey-comb than like a sponge, and contains merely a large number of individual but not connected voids, it will be lacking in the desired degree of porosity, which is an indispensible concomitant of permeability. In a product produced by an unsuitable foaming agent, the individual cells are practically intact, with few evidences of cell perforation or open passages forming interconnecting pores between the individual cells. But in a product made with a proper type of foam, the individual cell walls are perforated with large numbers of small openings, which provide tortuous inter-communicating passages throughout the body of the material, thereby imparting a high degree of permeability thereto.

The foaming agents differ among each other in efficacy, more of one kind being required than of others to obtain a given degree of permeability. Thus, to obtain a permeability of 20 A. F. A. units requires the following amounts of various foaming agents:

"Ultrawet E," which is an anionic alkyl aryl sulfonate, requires 0.013% (on the weight of the dry plaster mixture); "Product QB," a cationic quarternary ammonium compound, 0.016%; "Product BC," a non-ionic form of betaine, 0.075%; "Igepon T," an anionic amine 0.037%; "Duponal G," an anionic alcohol sulfate, 0.018%; while natural products such as saponin, which is non-ionic requires 0.45% and a glucoside derived from licorice, also non-ionic, requires 0.85%. Of the above, "Ultrawet E" is the preferred material, having a relatively efficiency of 100 as compared with efficiencies of only 2.9 for the saponin and 1.5 for the licorice glucoside, the other products being between saponin and "Ultrawet E."

The foaming or surface active agents may be added to the plaster to produce the desired type of body structure by any of three methods:

(1) A foam may be pregenerated from a mixture of the surface active agent and water, followed by addition of the proper amount of dry plaster to the foam and continued mixing to incorporate the plaster with the foam;

(2) A slurry of plaster and water may be prepared, the slurry and a pre-generated foam then being blended by further mixing.

(3) The foaming agent may be pre-mixed dry with the plaster and the resulting mixture mixed directly with water, employing proper mixing procedures. The amount of the foaming agent may vary from 0.10 to 20 parts per 100, and preferably 0.3 to 3.0 parts per 1000.

Table 1 shows differences in efficiency, permeability and density of casts made from "alpha" gypsum and an efficient foaming agent, mixes being made in accordance with these three methods of obtaining the desired structure.

"Alpha" gypsum is a special type of calcium sulfate hemihydrate (Patent No. 1,901,051), produced by calcination of gypsum under moderate steam pressure, and characterized by low mixing water requirements to produce a pourable slurry, and by development of high strength in the set product.

TABLE 1

*Effect of Variation in Method of Addition of Foaming Agent and Mixing Procedure*

Mixing conditions:

A. *Dry plaster added to pregenerated foam.*— The foaming agent "Ultrawet E" was added to 600 c. c. water contained in a 12 qt. standard Hobart Mixer Bowl (Hobart Mfg. Co.). The foam was generated by mixing a high speed (357 R. P. M.) with a combination oscillating and rotating mixing action, employing a wire whip type of mixer and beating for 5 minutes, at which time a stable, fine-celled, uniform foam was produced. 1,000 grams dry "alpha" gypsum were added to the foam, mixing being continued for an additional two minutes.

B. *Plaster slurry added to pregenerated foam.*— Same as A, except that the foam was prepared with foaming agent added to 200 c. c. water. A slurry of 1000 grams of "alpha" gypsum (1,000 grams and 400 c. c. water) was added to the foam, and the mixing continued for an additional 2 minutes.

C. *Foam generation in situ.*—A dry mixture of 1,000 grams of "alpha" gypsum and the foaming agent was mixed for 2 minutes with 600 c. c. of water, using the same type of mixer as in A and B above.

All mixes were cast immediately into 2" x 4" cylinder molds, the set casts removed and dried to constant weight ($CaSO_4 \cdot 2H_2O$) at 110° F., and then tested.

| | Method of Mixing | Parts "Ultrawet E" per 1000 parts "Alpha" Gypsum | Mold Properties | | |
|---|---|---|---|---|---|
| | | | Density lbs./cu. ft. | Comp. Str., lbs./sq. in. | Permeability A. F. units |
| A | Dry plaster to pregenerated foam | 0.2 | 22.5 | 147 | 219 |
|   | Do | 0.35 | 15.6 | 40 | 275 |
| B | Plaster slurry to pregenerated foam | 0.2 | 20.8 | 125 | 220 |
|   | Do | 0.35 | 16.2 | 49 | 260 |
| C | Foam Generation in Situ | 0.2 | 30.8 | 420 | 22 |
|   | Do | 0.35 | 22.5 | 235 | 90 |

It will be noted that molds of lower density and higher permeability are obtained with the separately generated foam than with the use of a pre-made dry mixture of foaming agent and plaster, (i. e. method C) probably because the full efficiency of the surface active agent is best developed by separate foam generation. However, lower density and more permeable molds may be produced by in situ foam generation, by the use of more efficient mixers and/or lengthening of the mixing time.

The type of plaster employed exerts a very great influence on the permeability of the resultant casts. By varying methods of calcination it is possible to produce $CaSO_4 \cdot \frac{1}{2}H_2O$ possessing variable physical characteristics, particularly with respect to normal consistency and strength. Normal consistency is defined as the amount of $H_2O$ required per 100 grams of plaster to produce a slurry of such a degree of fluidity as will just pour from a cup. In general, a hemihydrate such as "alpha" gypsum, which will produce a pourable slurry when mixed with a small amount of water, is more effective than a type of hemihydrate requiring the use of larger quantities of water to produce a mix of corresponding permeability. The following table lists permeability, density and compressive strength of casts made with the addition of 2.5 parts of "Product QB" (E. I. Du Pont) per 1000 parts of plaster, using "alpha" gypsum, "Aridized" reground No. 1 molding plaster (product of U. S. Patent No. 1,370,581) and a regular kettle calcined calcium sulfate hemihydrate. The mixing procedure was identical on these mixes, a dry premix of 1,000 grams plaster and wetting agent being mixed for 2 minutes with the specified amount of water, employing a Hobart mixer of the type described in connection with Table 1. In each case, the amount of mixing water employed was adjusted to produce foamed mixes possessing approximately equal fluidity or degree of flowability. It will be observed that the "alpha" gypsum, which requires only 50 parts of mixing water to obtain the same mixed fluidity as "Aridized" hemihydrate at 65, and kettle calcined hemihydrate at 90, is much superior to the Aridized or kettle calcined plasters in permeability. It is possible to obtain satisfactory high permeabilities with the use of Aridized or high-consistency calcined gypsums at moderate to high mixing-water ratios, but the amounts of surface active agents required are greater than when plasters of low normal consistencies are used, and molds of lighter weight and lower strength are produced.

TABLE 2

*Effect of various types of calcined gypsum*

| Type Calcined Gypsum | Normal Consistency of Plaster | Plaster Water Ratio (Pts. H₂O to 100 parts Plaster) | Mold Properties | | |
|---|---|---|---|---|---|
| | | | Density, lbs./cu. ft. | Comp. Str., lbs./sq. in. | Permeab. A. F. A. Units |
| "Alpha" gypsum | 42 | 50 | 24.8 | 221 | 42.5 |
| "Aridize" plaster | 60 | 65 | 45.4 | 460 | 2.5 |
| "Kettle" plaster | 82 | 90 | 49.2 | 870 | 0.4 |

For the development of maximum degree of permeability with a given type of plaster and wetting agent, it is desirable to employ the minimum amount of mixing water which will produce a mix of sufficient fluidity to flow and form a uniform and homogeneous mold as cast over a pattern. The marked effect of mixing-water ratio is shown in Table 3. This data was determined by mixing "alpha" gypsum with varying amounts of water under identical mixing conditions, same as employed in Table 2, Method A, the amount of foaming agent being varied as required to produce dried molds of the same density (40 lbs./cu. ft.):

TABLE 3

*Effect of variation in plaster : mixing-water ratio on foaming agent requirements and mold characteristics*

| Plaster: Mixing-Water Ratio (parts water/100 parts plaster) | Parts F. A. (Prod. "B") per 1000 parts plaster | Mold Properties | | |
|---|---|---|---|---|
| | | Density, lbs./cu. ft. | Comp. Str., lbs./sq. in. | Permeability A. F. A. units |
| 60 | 1.25 | 40 | 404 | 1.85 |
| 50 | 1.75 | 40 | 460 | 7.2 |
| 45 | 1.84 | 40 | 313 | 31.5 |
| 40 | 1.87 | 40 | 190 | 105 |
| 35 | 1.92 | 40 | 110 | 225 |

It will be observed that permeability increases very rapidly as mixing-water ratio is decreased, even though mold density remains constant. Strength decreases with increase in permeability. Microscopic examination of the mold structure reveals a larger proportion of perforated cell walls in the case of molds cast at the lower mixing water ratios. It is this degree of difference in proportion of perforated to unperforated cell walls which probably accounts for both the high permeability and the low strength of the mixes made with a low water content.

In general, moderately low mixing-water ratios provide advantages of maximum strength for a given permeability, and easy, fast drying.

In certain cases it was found advantageous to employ slurries mixed at somewhat elevated temperatures, say in the range of 125°–150° F. Mixing at such temperatures results in the production of a somewhat more uniform and finely celled foam structure, and lowers the expansion of the mass which occurs during setting thereof, which in the case of use over intricate or fine detailed patterns may occasion difficulty in release of the set molds from the patterns. The effect of temperature on permeability of the set casts is inappreciable.

The type of mixing action required to obtain full efficiency from the foaming agent employed is most important. It is preferable to employ a mixer so designed as to beat air into the mix and result in rapid development of a uniform, fine-called, stable foamed structure. Propeller and turbine type mixers, such as employed in flotation cell type mixers, with provision for air injection during mixing, are satisfactory. Other types of mixers which operate efficiently include motor driven spindles operating from a shaft extending into the mixing vessel. With certain types of mixers, such, for example, as propellers, variation in the size of a batch being mixed will produce considerable variation in the degree of permeability obtained. It was found possible largely to eliminate density and permeability variation within the batch, and with different size batches, by the use of a straight-sided mixing vessel, equipped with rounded bottom peripheral edges to eliminate the development of dead pockets within the vessel, and mixing with a spindle type mixer equipped with straight peripheral mixing bars which operate essentially parallel to the sides of the vessel. Uniformity within the batch may be further improved by providing a standard mixing propeller or turbine type of mixer on the bottom of the shaft, surmounted by a spindle type mixer, the bars of which extend above the top of the slurry during mixing. With a combination mixer of this type, the propeller or turbine action provides vertical and tangential agitation, with thorough blending of the slurry. The spindle bar act to incorporate air rapidly and efficiently into the mix. The rate of foam development may be enhanced by equipping the mixing vessel with one or more baffles attached to the sides thereof and extending vertically from the bottom to the top of the vessel.

The mixer should be so designed that a mixing time of 2 to 4 minutes will normally be required to develop the required degree of permeability. Continuously acting mixers which provide a constant supply of properly foamed plaster slurry may be employed where the operations are on a large scale.

When operating on integral mixes of dry plaster and surface active agents, which type of mixing is probably of most practical commercial importance, the properties of the resultant mix, so far as density and permeability are concerned, can be controlled quite accurately by proper control of the time of mixing. In general, with a mixer of proper design, the foam development continues to increase for a period of from 5 to 10 minutes. Permeability of a mix of given composition is a function of the wet and dry density of the resultant mix, which in turn can be controlled accurately to within practical limits by control of the mixing time.

There is a general relationship between the permeability, density and time of mixing. That is to say, for any given foaming agent, and using a constant amount thereof, and a constant plaster:mixing water ratio, the time during which the mixture is agitated controls the permeability. In general, the longer the mixing, the lower the density and the higher the permeability.

The precise relationship existing between weight and permeability of mixes of given composition provides an easy and simple method for the control of permeability in the foundry. By determining the wet density of a mix at various mixing time intervals, it is possible by reference to a weight-permeability chart or curve, accurately to select the mixing time required to produce a mold of any desired permeability within the range of the composition employed. Such a chart may easily be prepared by any skilled operator, plotting density against time and permeability against time. This can be done on a single chart.

Many additives may be employed with the compositions of the present invention to impart other characteristics to the finished mold. For example, finely ground gypsum, potassium sulfate, sodium citrate, or other known additives for either acceleration or retardation of setting time may be employed for the control of the set. In general, it is preferable so to accelerate or retard the compositions as to develop setting times of about 10 to 20 minutes, which time interval provides sufficient time for proper mixing and yet achieves speed of release of the molds from the patterns. Faster or slower sets may be employed with good results.

Additives to increase or decrease the normal consistency of the plaster mixes, or to vary the physical characteristics of the foam structure may be used. For example, combination additives of small amounts of gum arabic and Portland cement or lime may be used with plasters to reduce their normal consistency, thereby reducing water-to-plaster ratios required to obtain pourable mixes with increased permeability and greater strength. Other consistency-reducing agents, such as "Daxad," (Dewey & Almy Chem. Co.) and other glycosides, are also effective for this purpose.

It was found that the setting expansion of the compositions of the present invention is generally higher than that which occurs during the hydration of normal plaster-water slurries. This high setting expansion may be desirable in certain types of foundry uses, but is undesirable in others, such, for example, as in production of molds possessing parts of small cross-section, or fine pieces which may be difficult of removal from the pattern. Setting expansion may be reduced to or below normal plaster values by the addition of small amounts of such well known expansion controllers as soluble potassium salts, Portland cement, or combinations of the two. As disclosed above, operation at a slurry temperature slightly above normal is also beneficial in reducing setting expansion.

Additives to control thermal expansion and mold cracking characteristics of the compositions may also be employed. Particularly in the production of large size castings, the pouring of molten metal into gypsum molds, represented by compositions as disclosed, results in surface calcination of the molds, which may be accompanied by mold cracking prior to surface freezing of the cast metal. This defect can be largely eliminated by combining with the plaster relatively large amounts of refractory aggregates, such, for example, as fine silica, powdered fire brick or burnt clay, crystobalite, chrome ore, etc. Silica is particularly advantageous as it controls changes in dimension during the casting of the metal into the molds. Additionally, small quantities of talc, asbestos or similar inorganic fibrous aggregate, mica, etc., have been found to be helpful in reducing or eliminating mold cracking during casting of the metal. Such aggregates also are valuable in that they permit complete dehydration of molds without rupture prior to casting of metal therein when such technique is desired.

Additives designed to impart improved metal surface characteristics may also be used, including reducing agents, such as sugar, glycerol, graphite, etc., magnesium silico-fluoride, sulphur compounds (for use in casting of magnesium), etc.

Foamed compositions as described above may be formed over any type of pattern as commonly employed in foundry practice, such, for example, as patterns made from wood, plaster, metal, plastics, rubber, etc. Additionally, the compositions produce excellent molds when cast over patterns or in core boxes prepared from flexible mold-making materials, such, for example, as glue, gelatin, vinyl chloride compositions, (Korogel) etc. The foam structure of the compositions of the present invention, when formed over such patterns, is destroyed immediately at the pattern-slurry interface with the development of a very thin, fine grained, smooth plaster surface over all parts of the mold which eventually come into direct contact with the molten metal. As used over rigid types of patterns, common separating compounds employed to effect ready release of the set plaster from the pattern may be employed as thin coatings.

Commonly used separating compounds include suspensions of stearic acid in kerosene, vaseline, or heavy lubricating oil, wax suspensions or solutions, and oil-wax emulsions. Liquid types of separators containing fine mica or graphite in suspension are effective. It was found that the emulsifying action of surface active agents employed in the compositions of the present invention may have a tendency to remove excess separating medium from the pattern surfaces, particularly when such mediums are of types that are easily emulsified. Antifoaming agents may be employed to advantage either as additions to the separating medium employed on the pattern surfaces, or as a light film which may be sprayed or painted directly over the patterns after they have been treated with the separating medium. Such antifoaming agents may consist of the higher alcohols, such as octyl or decyl alcohol or their derivatives. Silicone antifoamers, such as D C Antifoam A (Dow Corning) are also effective for this purpose. Antifoams operate by raising the surface tension of water films with which they come in contact. Their use in treating patterns is indicated where difficulty is experienced in obtaining mold release from such patterns. They provide an increased thickness of smooth, micro-porous, non-cellular plaster film which may be advantageous in the production of certain types of castings, particularly of large size, where greater plaster strength is needed to prevent surface film rupture over large cells due to excessive metal loads during casting.

The processing treatment accorded set molds prepared in accordance with the present invention after the molds have set and before the metal is cast into them will vary, dependent upon the type and permeability of the composition employed, and the type and size of the casting to be made. In actual practice it will generally be found desirable to dry the molds sufficiently to remove a part or all of the free water present after setting of the mold, without carrying the drying time and temperatures to the extent that actual water of hydration is removed. To dry molds to such a point as to insure complete elimination of all free moisture, without liberation of any of the water of hydration, it is desirable to dry the molds at oven temperatures of not exceeding approximately 125° F. Faster drying may be achieved by placing the molds in ovens at temperatures ranging from 300° to 1000° F., but reducing the oven temperatures rapidly as free water is released. In general, very little calcination, or dehydration of the mold will occur so long as the mold body contains appreciable amounts of free water, say in the range of approximately 2 to 5%. Rate of drying may be increased by use of circulating air or flue gas in the drying ovens. Radiation drying, such as by use of radiant types of electric or gas fired heaters, is effective and efficient. With certain types of molds, and for certain types of casting, it will be found desirable to remove a part or all of the chemically combined water, in addition to the free water, by more intensive heating. For example, molds may be completely dehydrated by drying in ovens at temperatures above 400° F. until the mold weight becomes constant. Dehydration is accompanied by mold shrinkage, decrease in strength, and tendency to crack; therefore, unless essential to obtain success in production of certain types of intricate castings, or for parts of molds, such as completely enclosed cores, it is preferable to avoid complete dehydration. By heating molds at moderately low temperatures, say from 200° to 300° F., three fourths of the combined water present in the mold is removed, the calcium sulfate content being largely present as hemihydrate. Calcination of molds to the hemihydrate stage is often preferred to calcination to the anhydrite state, as much less dimensional shrinkage occurs, strength is not reduced to the same degree, and the molds are less subject to cracking.

For small and simple castings, it is possible to employ the compositions of the present invention as molds without removal of any water, either free or combined. Compositions of very high permeabilities, in the range say about 40 to 50 A. F. A. units, should be selected for such purpose. When so employed, the molds may be released from the patterns as soon as they have set completely, assembled, and castings then made immediately, without any mold drying operation whatsoever. This obviously is a great economic advantage, and something hitherto quite impossible of achievement.

Table 4 lists physical properties of two compositions representative of those which have been found practical for use in the production of metal castings, showing physical properties of the molds prepared from these compositions as dried to constant weight at 100° F., or to complete release of free water, the mold consisting of $CaSO_4.2H_2O$ and, as dried out to a constant weight at 500° F., the mold then consisting of anhydrous $CaSO_4$. Comparative values are shown for an ordinary plaster metal-casting mold, containing 80% of plaster of Paris, 20% of fibrous talc and mixed at a plaster to water mixing ratio of 100:140, as representative of prior art procedure in this field.

TABLE 4

*Effect of variable mold dry-out conditions*

| Composition | 1 | 2 | 3 |
|---|---|---|---|
| "Alpha" Gypsum | 1,000 | 1,000 | |
| "Product QB" | 1.75 | 2.2 | |
| Calcined Gypsum | | | 800 |
| Fibrous Talc | | | 200 |
| Water | 500 | 400 | 1,400 |

| Mold condition | As Cast | Dried At— | | As Cast | Dried At— | | As Cast | Dried At 500° F. Anhy. |
|---|---|---|---|---|---|---|---|---|
| | | 110° F. Dihy. | 500° F. Anhy. | | 110° F. Dihy. | 500° F. Anhy. | | |
| Mold Density, lbs./cu. ft. | 48.0 | 37.5 | 30.3 | 42.7 | 38.0 | 29.2 | 35 | 22.3 |
| Permeability A. F. A. units | 13 | 17.5 | 21 | 136 | 160 | 172 | 0 | 0.6 |
| Comp. Str., lbs./sq. ft. | 185 | 400 | 80 | 75 | 122 | 25 | 95 | 49 |
| Shrinkage during mold conditioning (lineal) | 0.0 | 0.0 | −1.5 | 0.0 | 0.0 | −1.4 | 0.0 | −1.4 |
| Water in Mold, free and combined, lbs./cu. ft. | 17.7 | 7.2 | 0.0 | 14.5 | 5.5 | 0.0 | 41.7 | 0.0 |

Table 5 hereinbelow lists examples of representative compositions which have been found effective in the practice of the present invention. The physical data listed for each composition was obtained on test specimens prepared by mixing, as indicated, either additions of dry plaster to a pregenerated foam (Method A) or from a dry mixture of plaster and foaming agent (Method C). The foamed slurry was cast into 2" x 4" cylinder molds. After setting, the molds were dried to constant weight at 110° F. to complete elimination of free water, the $CaSO_4$ content thereof being present as dihydrate. Strength and permeability tests were then made on the cylinders.

a mixing water ratio of 60–65 parts, as contrasted with only 45 parts of water with "Daxad." In general, addition of chemical additives increases the amount of surface active agents required to produce mixes of a given density and/or permeability.

Multiple piece molds, or cores, may be dried with the mold pieces assembled before drying, or with assembly following the drying. In general, drying efficiency is higher and the drying time required is less if the mold pieces are dried separately, with the mold assembly following the completion of the drying.

One of the principal advantages of the present invention is the fact that simple changes in com-

TABLE 5—EXAMPLES

| Example No. | Amt., Per Cent | Additive | Foaming Agent | | c. c. Water per 100 g. Mixture | Mixing Method [1] | Characteristics of Mold Dried at 110° F. | | |
|---|---|---|---|---|---|---|---|---|---|
| | | | Type | Pts. per 1,000 | | | Density, lbs./cu. ft. | Compr. St., lbs./sq. in. | Permeability A. F. A. Units |
| 1 | 100 | | "Prod. QB" | 1.5 | 60 | A | 34.2 | 205 | 5.6 |
| 2 | 100 | | do | 1.8 | 50 | A | 35.6 | 290 | 24.5 |
| 3 | 100 | | do | 2.0 | 40 | A | 27.8 | 210 | 277.0 |
| 4 "Alpha Gypsum" (U. S. Pat. 1,901,051). | 100 | | Soap Bark | 4.5 | 50 | A | 29.7 | 114 | 9.0 |
| 5 | 65 | Silica, 35% | "Ultrawet E" | 1.2 | 50 | C | 41.7 | 260 | 2.3 |
| 6 | 70 | Silica, 25% | "Igepon T" | 0.75 | 65 | A | 33.0 | 235 | 4.5 |
| 7 | 69.24 | Silica, 30%, Fibrous Talc, 5%, Port. cement .5%, $K_2SO_4$, 0.25%, Na Citrate, 0.01% | "Ultrawet E" | 3.0 | 50 | C | 44.8 | 277 | 7.1 |
| 8 Plaster of Paris (U. S. Pat. 1,370,581). | 100 | | do | 1.5 | 60 | A | 42.5 | 254 | 2.0 |
| 9 | 70 | Silica, 29.5%, "Daxad 27," 0.5% | "Igepon T" | 0.37 | 45 | A | 49.5 | 364 | 35.2 |

[1] A—Foam made, dry mixture added. C—In situ mix.

In foundry use, the slurries prepared as described above are cast over rigid or flexible patterns which may be enclosed in standard foundry flasks, or cottles. The slurry is then allowed to set, the patterns removed and the mold either partially dried out, partially dehydrated, or completely dehydrated, depending upon the type of casting to be made, or the composition. Mixes represented by Example 3 possess sufficiently high wet permeability to permit production of aluminum, brass or bronze castings directly in such molds, without the need for preliminary dry-out of the mold. Mixes such as are represented by Examples 6 or 7, are particularly advantageous for the production of molds which will withstand partial or complete dehydration by high temperature calcination without severe mold cracking or checking during the mold burnout and casting operations. The mix represented by Example 7 possesses low setting expansion, and is particularly adapted to the production of molds of extremely variable cross section, or containing thin or irregularly shaped members, normally difficult of removal from patterns. Example 9 lists a composition containing an agent ("Daxad 27") which is effective in reducing the amount of water required to produce a slurry of pourable fluidity. Without "Daxad," the composition listed as Example 9 would have required position and mixing technique permits production of molds covering a wide range of strength and permeability.

In making certain types of castings it may be found desirable to vary the strength, hardness, and permeability of different parts of a multiple piece mold in which the casting is formed. For example, the drag portion of such a mold may be cast from a composition which, when mixed with water, produces a set body possessing a moderate degree of permeability, and high strength and surface hardness to provide resistance to the flow of molten metal during the casting operation, without damage to the mold surface detail. A mix as represented by Examples 1 or 2 would be suitable for such purposes. In such a casting it might be desirable to prepare the cope portion of the mold from a mix possessing an extremely high degree of permeability to provide very easy exit means for mold and metal gases from the top portion of the mold during the casting of molten metal thereinto. A composition such as illustrated by Example 3 might be found suitable for this portion of the mold. In this particular casting, it might be found desirable to partially or completely dehydrate the cores, which are included as part of the mold, and compositions such as illustrated by Examples 5, 6 or 7 might well be used in making of such cores. In this case, the cope and drag portions of the mold would be heated to a moderately low temperature, and to a degree necessary to remove only the free water present, the CaSO₄ content of the mold being present as dihydrate. The cores could be heated to a higher temperature, separately from the cope and drag portions of the mold, to partial or complete liberation of combined water present in the original set gypsum, the calcined cores thereafter being assembled in the mold and the castings made.

Another advantage of the present invention resides in the fact that molds prepared from the above compositions may be cast in ordinary metal or wood foundry flasks, and allowed to remain in such flasks until castings have been poured. In the past it has been impractical to contain metal casting plaster molds in flasks during the dehydration or autoclaving treatment necessary to condition the molds to receive the molten metal. The thermal expansion and contraction characteristics of plaster during the steps of hydration and/or dehydration are sufficiently different from that of any flasking material to cause distortion, warping, or release of the mold from the sides of the flask during mold processing. By the present process, dimensional change of the plaster is inappreciable during the simple release of free water which occurs during the heating at moderately low temperatures, and molds can be retained in the flasks during the dry-out and the casting of the metal. This method of handling permits foundries to make and handle much larger and more complicated molds with the added reinforcement of flasks for containing them than have heretofore been possible, and helps greatly in reducing mold loss due to accidental breakage. It also facilitates accurate assembly of multiple piece molds and provides a means of permitting handling of molds in the same manner as sand molds are normally handled, a technique with which foundry operating personnel is completely familiar.

It is possible to employ molds of the above indicated compositions having much greater strength than is feasible to use with other types of mold materials. In general, if molds possess too high a degree of strength, the mold material will not crush under pressure during the freezing of the cast metal, and tearing or rupture of the casting may result, due to stresses set up in the metal by contraction during cooling. A strong, rigid mold prevents relief of stresses as the metal contract during cooling, with danger of failure. In the case of the composition of the present invention, and in particular when dealing with molds which have been dried out to only the dihydrate stage before casting, the initial strength of the mold itself is quite high, say for example within the range of 100 to 500 pounds per square inch compressive strength. Surface calcination of the dihydrate content of the mold occurs when molten metal contacts the mold during the casting process. Calcination is accompanied not only by liberation of combined water of hydration, which is released through the mold pores, but by a very great decrease in strength of the calcined portion of the mold surface itself. Under the action of high temperature therefore, the portion of the mold next to the metal becomes very greatly lowered in strength, and sufficiently soft to yield easily under strains set up by the contracting metal during cooling thereof. The internal porosity of the mold is so great that the mold material is readily compressed upon itself during metal cooling and freezing, with the result that perfect castings may be obtained without development of internal stresses. It is thus possible by use of the compositions herein described to produce exceedingly strong molds, highly desirable for use in case of handling, and for initial shaping of the molten metal, following by a sufficient loss in strength of that portion of the mold next to the casting so as to permit the production of perfect castings.

Molds containing a calcium sulfate binder, such as those described above, are eminently suited for the production of non-ferrous castings and in general for most metals which are cast at temperatures of less than approximately 2200° to 2300° F.

The present invention may, by suitable modifications in mixing technique, be extended to the production of molds suitable for casting metals having a higher melting point, such as ferrous alloys, stainless steel, etc., by substituting for the gypsum plasters hereinabove described other cementitious or setting materials capable of withstanding the higher temperatures, foam being relied upon to obtain the desired permeability.

Thus, one may use molds made from various cements such as high alumina cement (so-called "Lumnite") in combination with suitable refractory aggregates and fillers as silica, chrome, calcined magnesia, etc.

By proper manipulation, silica molds derived from aqueous solutions of ethyl silicate or sodium silicate may be rendered permeable by means of foaming agents in the general manner hereinabove disclosed, the molds being highly heat-resistant and hence adapted for the casting of high melting point alloys.

Reserving to themselves such modifications as will readily occur to those skilled in the metal-casting and mold-making arts, applicants claim:

1. Process of producing a permeable calcium sulfate metal-casting mold which comprises preparing a pourable slurry from a calcined form of calcium sulfate, only enough water to form a flowable slurry, and a foaming agent chemically compatible with calcium sulfate and capable of forming evanescent foam bubbles in its presence; agitating said slurry under free surface access of air to introduce air bubbles thereinto; pouring the aerated slurry into a flask containing a pattern having a surface capable of immediately breaking the foam at the interface between the pattern and the slurry, and permitting the latter to set.

2. Process of producing a permeable calcium sulfate metal-casting mold which comprises mixing a calcined gypsum slurry containing only enough water to be pourable with a foam susceptible to partial rupture of the cell walls thereof, pouring the thus foamed slurry over a pattern having a foam-breaking surface and permitting the slurry to set in contact therewith to produce a set gypsum body characterized by therein contained interconnected foam-like voids.

3. Process of producing a permeable calcium sulfate metal-casting mold which comprises gauging a calcined gypsum plaster containing a foaming agent with only sufficient amount of water to form a pourable slurry, incorporating air with said slurry to form therein evanescent thin-walled air-bubbles; casting the thus aerated slurry in contact with a pattern having a surface capable of breaking said foam at the interface between the pattern and the slurry, and permitting the latter to set, removal of free water during the setting action resulting in partial rupture of the walls of the air-bubbles, thus leaving intercommunicating voids having substantially the shape of the bubbles in the set mass.

4. Process of producing a permeable calcium sulfate metal-casting mold which comprises gauging calcined gypsum containing from about 0.01% to not exceeding about 2% by weight of a foaming agent non-reactive with gypsum, with an amount of water just sufficient to form a flowable slurry, introducing air into said slurry in the form of evanescent, thin-walled rupturable bubbles, pouring the thus aerated slurry into a flask containing a pattern coated with a foam-destroying substance whereby to form a mass having a smooth surface in contact with said pattern and an interior permeated by said bubbles, effecting setting of said slurry by hydration of the calcined gypsum during which action the walls of the individual cells are partially ruptured, thus producing voids in free intercommunication with each other and having substantially the shape of said bubbles, thus rendering the resulting mass highly permeable to fluids, removing said mass from the pattern and drying the mass at least to the extent of removing uncombined water therefrom.

5. Process of producing a highly permeable but structurally strong calcium sulfate dihydrate metal-casting mold which comprises mixing calcined gypsum with an amount of water sufficient to yield a pourable slurry, said water containing a foaming agent compatible with gypsum and capable of yielding copious but evanescent bubbles; incorporating gaseous bubbles with said slurry, and pouring it over a suitable pattern; allowing the slurry to set in contact with said pattern by hydration of the calcined gypsum; and thereafter removing the thus formed mold from the pattern and drying it.

6. Process of producing a highly permeable calcium sulfate metal-casting mold which comprises mixing calcined gypsum and a foaming agent with water to yield a slurry, agitating said slurry to generate gaseous bubbles therein, casting the resulting aerated slurry against a pattern, allowing the thus cast slurry to set, removing it from the pattern, and removing the water therefrom.

7. Process of preparing a fluid-permeable mold with a smooth surface layer representing the part to be produced, comprising the steps of adding to a calcium sulfate plaster a minor proportion of a foaming agent which is not precipitated from aqueous solutions by calcium sulfate, forming a slurry therefrom with at least enough water to form a flowable slurry, agitating the slurry under conditions adapted to introduce air into the slurry, whereby a foamed slurry is formed, pouring the thus formed slurry over the pattern the reproduction of which is desired, whereby the foam is broken to provide a smooth surface layer, and allowing the plaster to set.

8. Process of preparing a fluid-permeable mold comprising forming an aqueous dispersion of a calcium sulfate plaster and a minor proportion of a foaming agent which is not precipitated from aqueous solutions by calcium sulfate by the use of at least enough water to yield a flowable slurry, agitating said slurry under conditions adapted to introduce air thereinto, whereby a foam is formed, pouring the thus foamed slurry over the pattern, the reproduction of which is desired, the said pattern having been coated with a parting compound adapted to increase the surface tension of the plaster slurry at the interface between the pattern and the said slurry, whereby the surface foam is broken to provide a smooth surface layer accurately representing the part to be reproduced, and allowing the plaster to set.

9. A mold for casting molten metal, consisting essentially of a body containing a filler, and set calcium sulfate dihydrate crystals that are interlaced and acicular in shape and which body is provided with innumerable individual contiguous voids arranged in foam-like formation, said voids having perforated walls rendering said voids intercommunicating, the surface of said mold intended for contact with molten metal being smooth and merely microporous, and the permeability of said mold lying within the range of from about 0.7 to 250 A. F. A. permeability units.

10. A mold for casting molten metal, comprising a body consisting essentially of set calcium sulfate dihydrate crystals which are interlaced and acicular in shape, said body being provided with innumerable individual contiguous cells arranged in foam-like formation and having perforated walls rendering said cells intercommunicating, the surface of said mold intended for contact with molten metal being smooth and merely micro-porous; the permeability of said mold lying within the range of from about 0.7 to about 250 A. F. A. permeability units.

11. A mold as defined in claim 10 in which the permeability lies within the range of from about 5 to about 30 A. F. A. permeability units.

12. A mold for casting molten metal consisting essentially of a filler and set calcium sulfate dihydrate crystals that are interlaced and acicular in shape, the body of the mold being provided with innumerable separate voids arranged in foam-like formation and having party walls that are ruptured so as to render said cells intercommunicating, said mold having an apparent dry density of from about 30 to about 50 pounds per cubic foot and a compressive strength of not less than about 200 pounds per square inch; the surface of the mold intended for contact with molten metal being smooth and merely microporous, with the permeability of the mold lying within the range of from about 0.7 to about 250 A. F. A. permeability units.

13. Process of producing a highly permeable calcium sulfate metal-casting mold which comprises mixing calcined gypsum and a foaming agent with water, agitating the resulting mixture to generate gaseous bubbles therein, applying the thus aerated mixture against a pattern, allowing the mixture to set, removing it from the pattern and drying it.

MANVEL C. DAILEY.
JOSEPH R. PARSONS.

REFERENCES CITED

The following references are of record in the file of this patent:

UNITED STATES PATENTS

| Number | Name | Date |
|---|---|---|
| 1,769,275 | Rice | July 1, 1930 |
| 1,871,806 | Roos | Aug. 16, 1932 |
| 1,901,053 | Dailey | Mar. 14, 1933 |
| 2,017,022 | Roos | Oct. 8, 1935 |
| 2,201,037 | Hagemeyer | May 14, 1940 |
| 2,220,703 | Bean | Nov. 5, 1940 |
| 2,288,736 | Osserman | July 7, 1942 |
| 2,322,194 | King | June 15, 1943 |
| 2,382,561 | Gregory | Aug. 14, 1945 |
| 2,399,411 | Watts | Apr. 30, 1946 |